US012598662B2

(12) United States Patent
Luo et al.

(10) Patent No.: US 12,598,662 B2
(45) Date of Patent: Apr. 7, 2026

(54) METHOD OF ESTABLISHING A WIRELESS COMMUNICATION CONNECTION, ELECTRONIC DEVICE, AND METHOD OF ESTABLISHING A WIRELESS COMMUNICATION CONNECTION FOR AN ELECTRONIC DEVICE

(71) Applicant: Acer Incorporated, New Taipei City (TW)

(72) Inventors: Li-Ju Luo, New Taipei City (TW); Chao-Kuang Yang, New Taipei City (TW); Liang-Chi Chen, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 316 days.

(21) Appl. No.: 18/582,852

(22) Filed: Feb. 21, 2024

(65) Prior Publication Data

US 2025/0081262 A1       Mar. 6, 2025

(30) Foreign Application Priority Data

Sep. 1, 2023     (TW) ................................. 112133195

(51) Int. Cl.
*H04W 76/14*          (2018.01)
*H04W 76/19*          (2018.01)
*H04W 84/12*          (2009.01)

(52) U.S. Cl.
CPC ........... *H04W 76/14* (2018.02); *H04W 76/19* (2018.02); *H04W 84/12* (2013.01)

(58) Field of Classification Search
CPC ..... H04W 88/06; H04W 84/12; H04W 76/19; H04W 76/14
See application file for complete search history.

(56) References Cited

U.S. PATENT DOCUMENTS 9,307,563 B2     4/2016   Tsai
11,582,611 B1 *   2/2023   Kwong ................. H04W 12/50
(Continued)

FOREIGN PATENT DOCUMENTS

CN            108029078 A  *  5/2018  ............. H04L 67/51
CN            111404663 A  *  7/2020  .......... H04W 28/065
(Continued)

*Primary Examiner* — Shean Tokuta
(74) *Attorney, Agent, or Firm* — McClure, Qualey & Rodack, LLP

(57)            ABSTRACT

The present invention provides methods of establishing a wireless communication connection. The method includes establishing a Bluetooth low energy (BLE) connection between an electronic device and a mobile device. The electronic device transmits first connection information related to the electronic device to the mobile device using BLE. The method further includes transmitting a first Wi-Fi direct pairing request from the mobile device to the electronic device according to the first connection information. According to the method, the electronic device obtains second connection information related to the mobile device according to the first Wi-Fi direct pairing request and cancels the first Wi-Fi direct pairing request. The method further includes using the electronic device to transmit a (Continued)

second Wi-Fi direct pairing request to the mobile device according to the second connection information to establish a Wi-Fi direct connection.

19 Claims, 6 Drawing Sheets

(56) References Cited

U.S. PATENT DOCUMENTS

| | | | | |
|---|---|---|---|---|
| 2014/0342670 A1* | 11/2014 | Kang | .................... | H04L 69/14 |
| | | | | 455/67.11 |
| 2015/0103708 A1* | 4/2015 | Kang | .................... | H04W 4/80 |
| | | | | 370/329 |
| 2016/0095141 A1* | 3/2016 | Ma | .................... | H04W 76/10 |
| | | | | 455/416 |
| 2017/0223579 A1* | 8/2017 | Lee | .................... | H04W 76/18 |
| 2020/0037239 A1* | 1/2020 | Koizumi | ............. | H04W 48/16 |
| 2020/0037374 A1* | 1/2020 | Koizumi | ........... | H04W 68/005 |
| 2020/0245386 A1* | 7/2020 | Xiao | .................... | H04W 4/12 |
| 2021/0127262 A1* | 4/2021 | Park | .................... | H04W 12/50 |
| 2023/0050948 A1 | 2/2023 | Cheong | | |
| 2023/0199866 A1 | 6/2023 | Chung | | |
| 2023/0337303 A1* | 10/2023 | Dong | .................... | H04W 4/80 |
| 2024/0196454 A1* | 6/2024 | Suo | .................... | H04W 76/14 |
| 2025/0081262 A1* | 3/2025 | Luo | .................... | H04W 76/19 |

FOREIGN PATENT DOCUMENTS

| | | | | | |
|---|---|---|---|---|---|
| CN | 111866824 A | * | 10/2020 | ............ | H04W 76/40 |
| CN | 111867148 A | * | 10/2020 | ............ | H04W 76/14 |
| CN | 112291764 A | * | 1/2021 | ........ | H04L 63/0815 |
| CN | 112312586 A | * | 2/2021 | ............ | H04W 76/14 |
| CN | 113286192 A | * | 8/2021 | ....... | H04N 21/43637 |
| CN | 114157659 A | * | 3/2022 | ............ | H04W 36/06 |
| CN | 114173183 A | * | 3/2022 | ....... | H04N 21/44222 |
| CN | 114286324 A | * | 4/2022 | | |
| CN | 115515255 A | * | 12/2022 | .............. | H04W 4/80 |
| CN | 116709584 A | * | 9/2023 | ............ | H04W 76/18 |
| CN | 117837181 A | * | 4/2024 | | |
| CN | 118019148 A | * | 5/2024 | ............ | H04W 48/16 |
| CN | 119603793 A | * | 3/2025 | ............ | H04W 76/14 |
| EP | 3606277 A1 | * | 2/2020 | ........ | H04N 1/00233 |
| EP | 3621358 A1 | * | 3/2020 | ............ | H04W 12/06 |
| ID | P202202892 A | * | 6/2022 | | |
| JP | 2014067096 A | * | 4/2014 | | |
| TW | 201347491 A | | 11/2013 | | |
| WO | WO-2016017908 A1 | * | 2/2016 | ............ | H04W 84/18 |
| WO | WO-2022228207 A1 | * | 11/2022 | ............ | H04W 4/08 |
| WO | WO-2025025875 A1 | * | 2/2025 | ............ | H04W 76/11 |

* cited by examiner

100

300 mobile device 110 electronic device 120

Figure 3A:
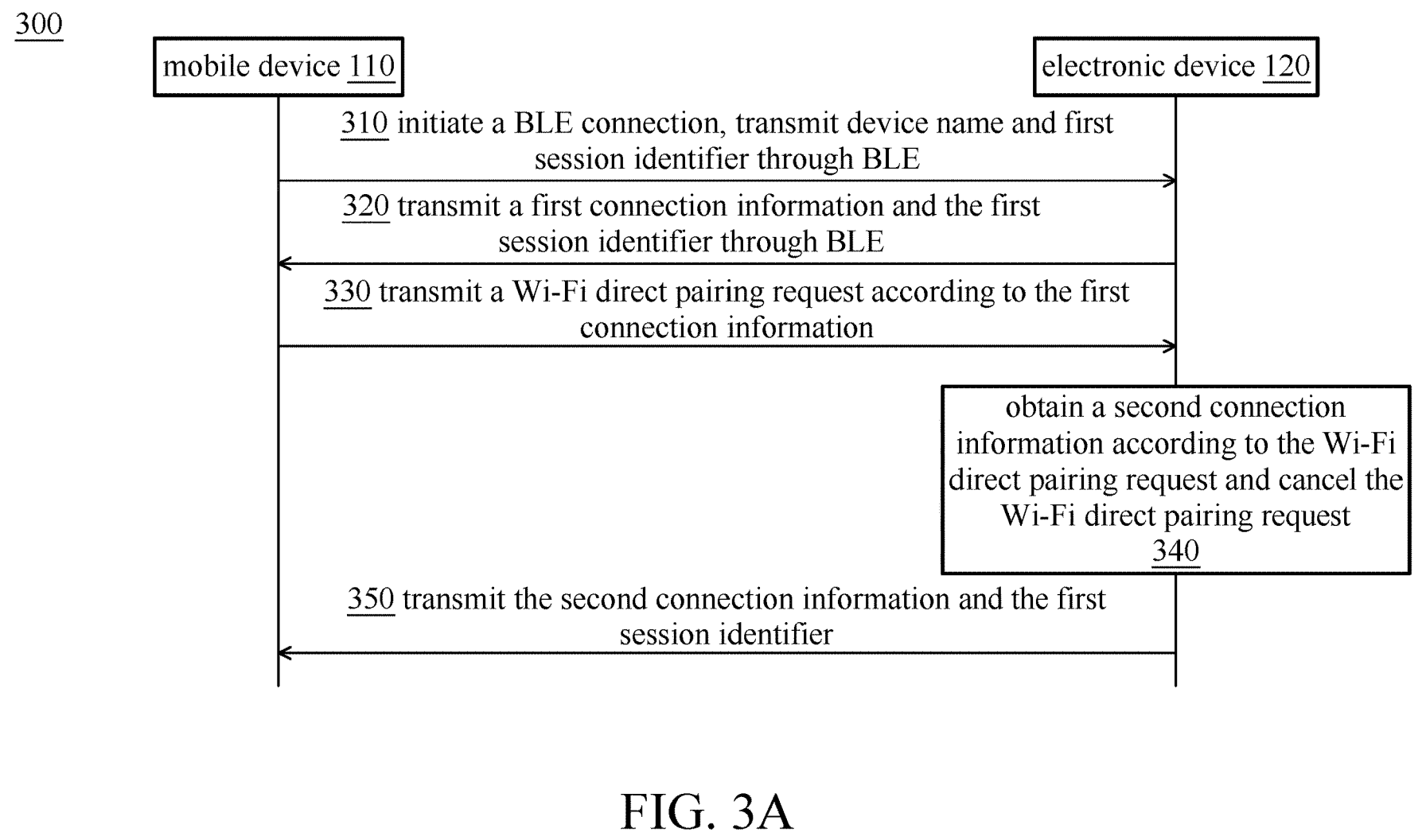

310 initiate a BLE connection, transmit device name and first session identifier through BLE 320 transmit a first connection information and the first session identifier through BLE 330 transmit a Wi-Fi direct pairing request according to the first connection information obtain a second connection information according to the Wi-Fi direct pairing request and cancel the Wi-Fi direct pairing request 340

350 transmit the second connection information and the first session identifier

FIG. 3A 410 initiate a BLE connection, transmit device name, second connection information, and session identifier 420 transmit a notification message 430 transmit a Wi-Fi direct pairing request according to the second connection information electronic device 120 mobile device 110

400

1

METHOD OF ESTABLISHING A WIRELESS COMMUNICATION CONNECTION, ELECTRONIC DEVICE, AND METHOD OF ESTABLISHING A WIRELESS COMMUNICATION CONNECTION FOR AN ELECTRONIC DEVICE

CROSS REFERENCE TO RELATED APPLICATIONS

This application claims priority of Taiwan Patent Application No. 112133195, filed on Sep. 1, 2023, the entirety of which is incorporated by reference herein.

BACKGROUND OF THE INVENTION

Field of the Invention

The present invention relates to method of wireless communication, and, in particular, to method for using Bluetooth Low Energy (BLE) to assist in the establishment of a Wi-Fi direct connection.

Description of the Related Art

Wi-Fi direct is a communication protocol that allows a Wi-Fi device to directly connect with another Wi-Fi device in a point-to-point manner and to perform data transmission rather than having to connect through the base station of a wireless network. However, in the scenario that a Wi-Fi direct application programming interface (API) offered in a Windows environment pairs with an Android device, the transmission of a pairing request from the cellphone side usually causes a pairing failure, or a long waiting time. Transmitting the pairing request from the computer side to the cell phone side can usually make pairing successful and establish connection. However, user experience may be negatively affected if the pairing request must be transmitted from the computer side.

Thus, a method for establishing a connection capable of successfully establishing a connection while the cell phone is transmitting the Wi-Fi direct request is required.

BRIEF SUMMARY OF THE INVENTION

An embodiment of the present invention provides a method of establishing a wireless communication connection. The method comprises establishing a Bluetooth low energy (BLE) connection to an electronic device using a mobile device. The electronic device transmits first connection information related to the electronic device to the mobile device using BLE. The method also comprises transmitting a first Wi-Fi direct pairing request from the mobile device to the electronic device according to the first connection information. The method also comprises using the electronic device to obtain second connection information related to the mobile device according to the first Wi-Fi direct pairing request and to cancel the first Wi-Fi direct pairing request. The method also comprises using the electronic device to transmit a second Wi-Fi direct pairing request to the mobile device according to the second connection information to establish a Wi-Fi direct connection.

In some embodiments, the first connection information related to the electronic device comprises a Wi-Fi direct media access control (MAC) address of the electronic device. In some embodiments, the second connection information related to the mobile device comprises a Wi-Fi direct media access control (MAC) address of the mobile device.

In some embodiments, before transmitting the first connection information, the method also comprises transmitting a first session identifier to the electronic device using BLE by the mobile device. The electronic device also transmits the first session identifier together with the first connection information to the mobile device using BLE. The electronic device also transmits the first session identifier together with the second connection information to the mobile device.

In some embodiments, the method also comprises receiving the second connection information and a second session identifier by the mobile device. The method also comprises using the mobile device to determine that the second session identifier is identical to the first session identifier transmitted to the electronic device; to stop waiting for the first Wi-Fi direct pairing request; and to start listening to other Wi-Fi direct pairing requests.

In some embodiments, the method also comprises transmitting the second connection information from the electronic device to the mobile device. After the mobile device receives the second connection information, the method also comprises transmitting the second connection information from the mobile device to the electronic device using BLE. The method also comprises determining that the second connection information received using BLE is identical to the second connection information obtained according to the first Wi-Fi direct pairing request and determining to transmit the second Wi-Fi direct pairing request from the electronic device to the mobile device.

In some embodiments, the method also comprises transmitting the second connection information to the mobile device using the electronic device. The method also comprises storing the second connection information in the mobile device, after the second connection information is received. When re-establishing Wi-Fi direct connection after a waiting time, the method also comprises transmitting the second connection information from the mobile device to the electronic device using BLE, and transmitting a third Wi-Fi direct pairing request to the mobile device according to the second connection information and establishing the Wi-Fi direct connection using the electronic device.

An embodiment of the present invention provides an electronic device comprising a processor. The processor is configured to implement a wireless connection module. The wireless connection module is configured to transmit a first connection information related to the electronic device to a mobile device using Bluetooth low energy (BLE) in response to a BLE connection from the mobile device. The wireless connection module is also configured to receive a first Wi-Fi direct pairing request. The first Wi-Fi direct pairing request is transmitted by the mobile device according to the first connection information. The wireless connection module is also configured to obtain a second connection information related to the mobile device according to the first Wi-Fi direct pairing request and cancel the first Wi-Fi direct pairing request. The wireless connection module is also configured to transmit a second Wi-Fi direct pairing request to the mobile device according to the second connection information and establish a Wi-Fi direct connection.

An embodiment of the present invention provides a method of establishing a wireless communication connection for an electronic device. The method comprises using the electronic device to transmit first connection information related to the electronic device to a mobile device using Bluetooth low energy (BLE) in response to receiving a BLE connection from the mobile device. The method also comprises receiving a first Wi-Fi direct pairing request from the mobile device, wherein the mobile device transmits the first Wi-Fi direct pairing request according to the first connection information. The method also comprises obtaining second connection information related to the mobile device according to the first Wi-Fi direct pairing request and cancelling the first Wi-Fi direct pairing request. The method also comprises transmitting a second Wi-Fi direct pairing request to the mobile device according to the second connection information and establishing a Wi-Fi direct connection.

BRIEF DESCRIPTION OF THE DRAWINGS

The present invention can be more fully understood by reading the subsequent detailed description and examples with references made to the accompanying drawings, wherein:

FIGS. 3A, 3B are the flow diagrams of the method for establishing wireless communication connection according to the embodiments of the present disclosure.

DETAILED DESCRIPTION OF THE INVENTION

The following description is made for the purpose of illustrating the general principles of the invention and should not be taken in a limiting sense. The scope of the invention is best determined by reference to the appended claims.

Figure 1A:
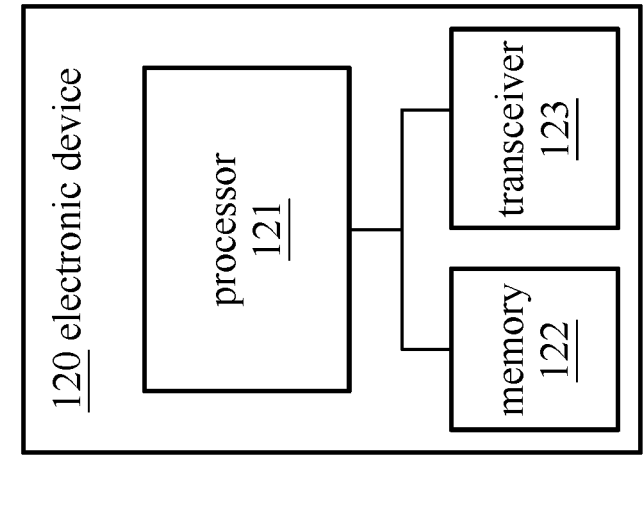
FIGS. 1A, 1B are the block diagrams of the communication system according to the embodiments of the present disclosure.
Figure 1A:
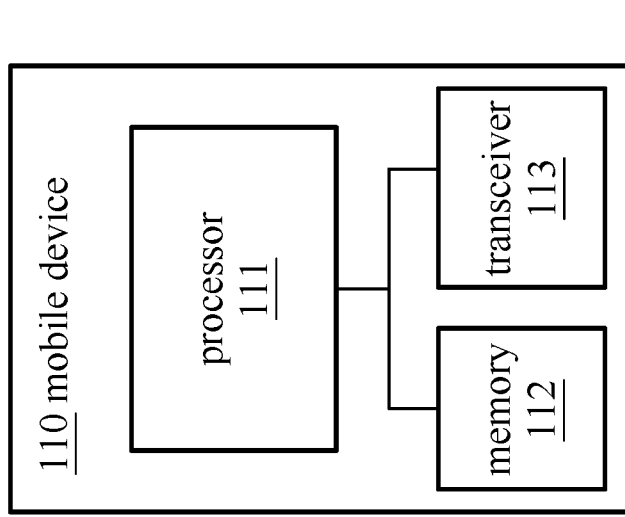

FIG. 1A is a block diagram of a communication system 100 according to embodiments of the present disclosure. Communication system 100 comprises a mobile device 110 and an electronic device 120. For example, the mobile device 110 is, but not limited to, a smart phone, and the electronic device 120 is, but not limited to, a desktop computer or a laptop computer. However, this should not be the limitation of the present disclosure. The mobile device 110 comprises a processor 111, a memory 112, and a transceiver 113. The electronic device 120 comprises a processor 121, a memory 122, and a transceiver 123. The processor 111, the memory 112, and the transceiver 113 in the mobile device 110 may connect to each other through a buffer. Similarly, the processor 121, the memory 122, and the transceiver 123 in the electronic device 120 may connect to each other through a buffer.

The processor 111 and the processor 121 respectively controls the operations of the mobile device 110 and electronic device 120. The processor 111 and the processor 121 provide the required process ability to perform operating systems, programs, software, modules, applications, and functions of the mobile device 110 and the electronic device 120. In some embodiments, the processor 111 and the processor 121 are configured to implement wireless connection modules. The wireless connection module is a software module, which is configured to perform operations relating to wireless communication. In some embodiments, the wireless communication module is configured to perform BLE functions and Wi-Fi direct functions of the mobile device 110 and the electronic device 120, and the BLE function and the Wi-Fi direct function comprise controlling the transceiver 113 and the transceiver 123 to transmit or receive data using BLE or Wi-Fi direct protocol. In some embodiments, the mobile device 110 and the electronic device 120 may comprise multiple processors 111 and processors 121 to jointly perform required tasks. For example, the processor 111 and the processor 121 may comprise general purpose micro-processor, central process unit, the combination of the general purpose processor and special purpose processor, and/or related chip set.

The memory 112 and the memory 122 respectively stores data required by the operations of the processor 111 and the processor 112 and other data required by the mobile device 110 and the electronic device 120. The memory 112 and the memory 122 may comprise non-volatile memories, such as read only memory (ROM), flash memory, etc., In some embodiments, non-volatile memories (e.g. flash memory) in the memory 112 and the memory 122 store firmware required by operations of the mobile device 110 and the electronic device 120, and the firmware may be operated by the processors 111 and 121. The memory 112 and the memory 122 may also comprise volatile memories, such as dynamic random access memory (DRAM) and static random access memory (SRAM) etc., In some embodiments, the memory 112 and the memory 122 store computer-readable instructions, such as program codes. These computer-readable instructions can be operated by the processors 111 and 121 to implement the wireless connection module.

The transceiver 113 and the transceiver 123 are capable to transmit and receive data wirelessly. In some embodiments, the transceiver 113 and the transceiver 123 transmit or receive data using BLE or Wi-Fi direct communication protocol, according to the instructions from the wireless connection module implemented by the processor 111 and the processor 121. In some embodiments, the transceiver 113 and the transceiver 123 are wireless communication chips comprising integrated circuits.

Moreover, the mobile device 110 and the electronic device 120 may also comprise other components which aren't shown in FIG. 1A. For example, the mobile device 110 and the electronic device 120 may also comprise, or wired/wirelessly connect to, at least one monitor, touch screen, keyboard, mouse, microphone, and/or speaker etc., In some embodiments, the mobile device 110 may provide phone functions.

Figure 1B:
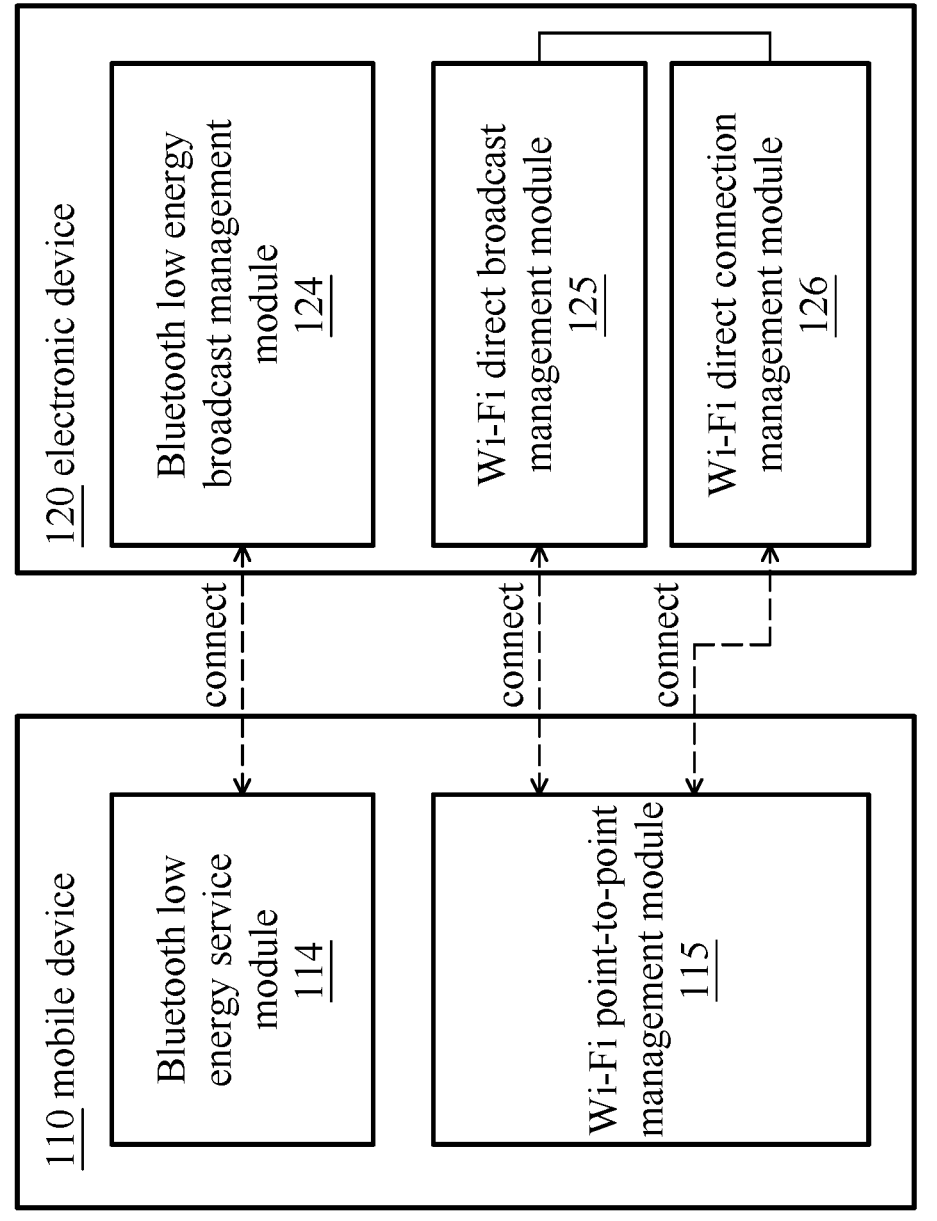

FIG. 1B is a block diagram of the communication system 100 according to embodiments of the present disclosure. In some embodiments, the wireless connection module implemented by the processor 111 of the mobile device 110 (such as a first wireless connection module) comprises a Bluetooth low energy service module 114 (also referred to as BLE service module 114) and a Wi-Fi point-to-point management module 115. The wireless connection module implemented by the processor 121 of the electronic device 120 (such as a second wireless connection module) comprises a Bluetooth low energy broadcast management module 124 (also referred to as BLE broadcast management module 124), a Wi-Fi direct broadcast management module 125, and a Wi-Fi direct connection management module 126.

The BLE service module 114 and the BLE broadcast management module 124 are respectively configured to implement BLE functions of the mobile device 110 and the electronic device 120, and the BLE functions comprise, but not limited to, searching devices capable to establish BLE connections, transmitting broadcasts, establishing/interrupting BLE connections, and transmitting/receiving data using BLE. The Wi-Fi point-to-point management module 115, the Wi-Fi direct broadcast management module 125, and the Wi-Fi direct connection management module 126 are respectively configured to implement Wi-Fi direct functions of the mobile device 110 and the electronic device 120, and the Wi-Fi direct functions comprise, but not limited to, transmitting Wi-Fi direct connection request to a certain device, accepting/refusing Wi-Fi direct connection requests, establishing/interrupting Wi-Fi direct connections, and transmitting/receiving data using Wi-Fi direct.

Figure 2:
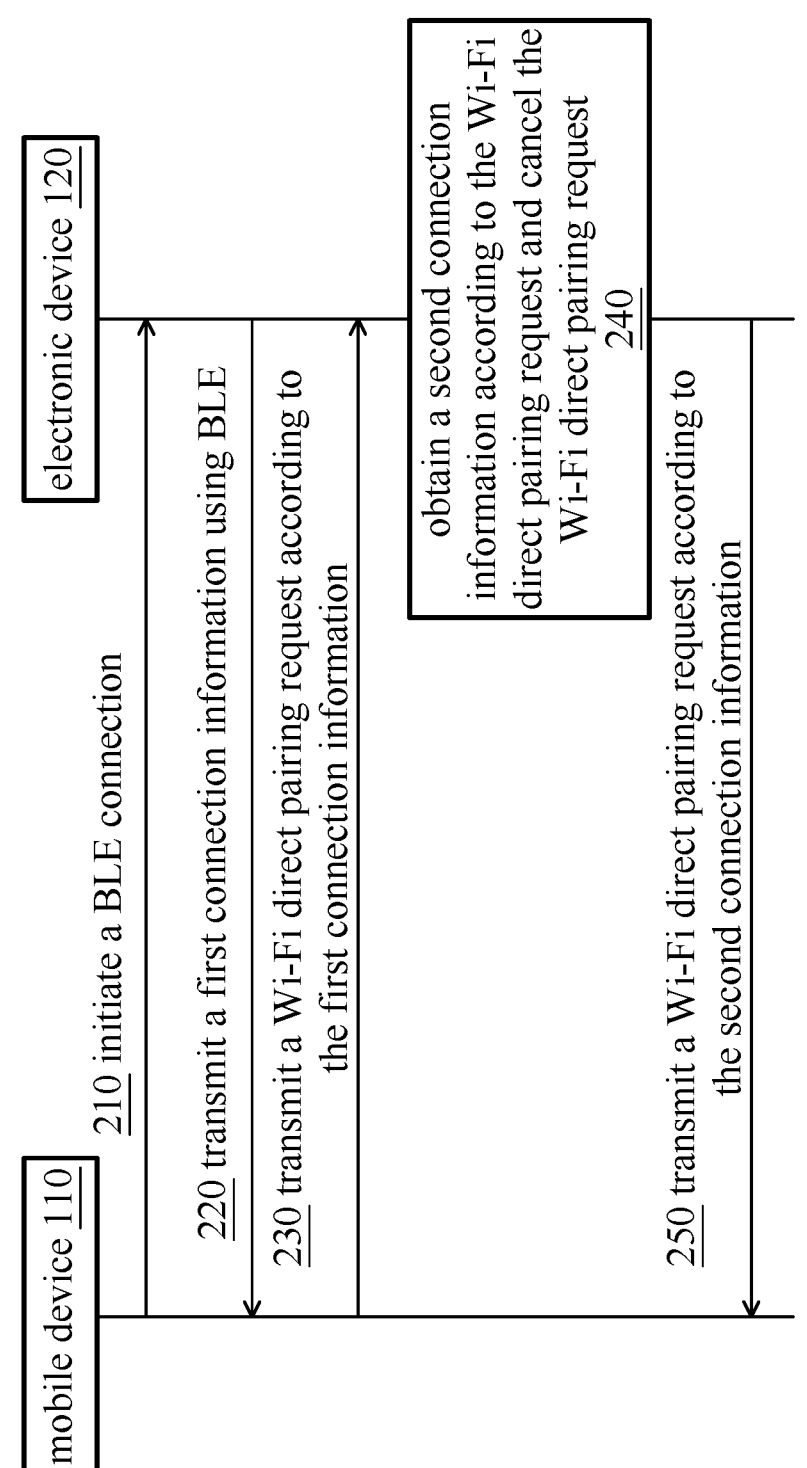
FIG. 2 is a flow diagram of the method for establishing wireless communication connection according to the embodiments of the present disclosure.

FIG. 2 is a flow diagram of the method 200 of establishing wireless communication connection according to the embodiments of the present disclosure. Method 200 can be performed by the processors 111 and 121 in the communication system 100 of FIG. 1A. Method 200 is described below in reference to FIGS. 1A, 1B. Method 200 may start from operation 210. In operation 210, the mobile device 110 initiates a Bluetooth low energy (BLE) connection to the electronic device 120 and establish a BLE connection with the electronic device 120. Then, in operation 220, the electronic device 120 transmits a first connection information related to the electronic device 120 to the mobile device 110 using BLE, in response to receiving the BLE connection from the mobile device 110.

After the mobile device 110 receives (e.g. using the transceiver 113 and the wireless connection module) the first information of the electronic device 120, method 200 proceeds to operation 230. In operation 230, the mobile device 110 transmits a Wi-Fi direct pairing request (such as a first Wi-Fi direct pairing request) to the electronic device 120 according to the first connection information. After the electronic device 120 receives the Wi-Fi direct pairing request (e.g. using the transceiver 123 and the wireless connection module), method 200 proceeds to operation 240. In operation 240, the electronic device 120 obtains a second connection information related to the mobile device 110 according to the Wi-Fi direct pairing request and cancels the Wi-Fi direct pairing request. Then, method 200 proceeds to operation 250. In operation 250, the electronic device 120 transmits a Wi-Fi direct pairing request (such as a second Wi-Fi direct pairing request) to the mobile device 110 according to the second connection information to establish a Wi-Fi direct connection.

As described above, transmitting a pairing request from the cellphone side usually causes pairing failure or long waiting time. However, in the scenario that the request is transmitted from the computer, because current API of cell phone side cannot obtain the Wi-Fi direct media access control (MAC) address of the cell phone, a search procedure must be performed at the computer side in order to list nearby Wi-Fi direct devices. Then, the user selects his/her own device according to the device list and presses the button to perform pairing. In this way, multiple actions have to be done manually, and the user have to identify the device and understand the pairing procedure. On the contrary, in the situation that the pairing request is transmitted from the cell phone side, the user can obtain the Wi-Fi direct MAC address using the cell phone and perform pairing, and the whole procedure requires only one action to start pairing and establish connection. Thus, the present disclosure can solve the above problem through aforementioned procedure. Embodiments of the present disclosure can successfully establish Wi-Fi direct connection and improve user experience.

Figure 3B:
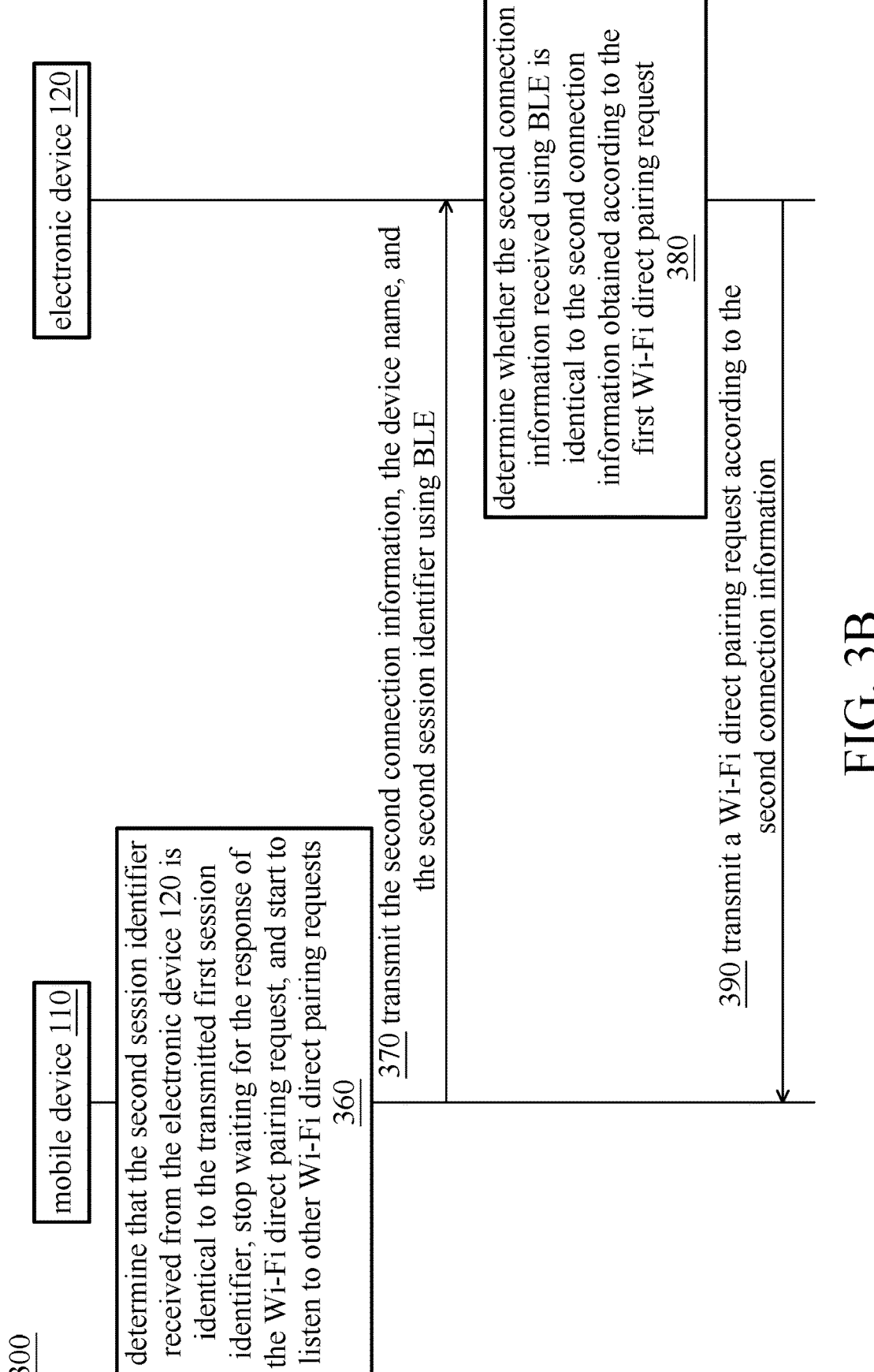

FIGS. 3A, 3B are the flow diagrams of the method 300 of establishing wireless communication connection according to the embodiments of the present disclosure. Method 300 can be performed by the processors 111 and 121 in the communication system 100 of FIG. 1A. Method 300 is described below in reference to FIGS. 1A, 1B. Method 300 may start from operation 310. In operation 310, the mobile device 110 initiates a BLE connection with the electronic device 120. The mobile device 110 transmits its own device name and generated session identifier (session ID) (such as a first session ID) to the electronic device 120 through BLE (using the BLE service module 114). The first session ID is a set of numbers generated by the processor 111 and is configured to identify the current communication process. In some embodiments, user activates an application in the electronic device 120 to cause the electronic device 120 to listen the Wi-Fi direct pairing request and to activate BLE service and wait for connection. In some embodiments, after the application is activated, the electronic device 120 shows a QR code on the screen. User can scan the QR code shown on the screen of the electronic device 120 using the mobile device 110 to obtain information required to establish a BLE connection and initiate a BLE connection. In some embodiments, after scanning the QR code, the mobile device 110 obtains a BLE service code of the electronic device 120. The mobile device 110 adds the BLE service code into the filter conditions of the search API to search a connection location of the electronic device 120 and initiate connection.

In operation 320, the electronic device 120 transmits a first connection information related to the electronic device 120 and the first session ID to the mobile device 110 through BLE (using the BLE broadcast management module 124), in responsive to the BLE connection from the mobile device 110 (for example, in responsive to establish a BLE connection with the mobile device 110 and receive the device name of the mobile device 110 and the session ID using the BLE broadcast management module 124). In some embodiments, the first connection information includes a Wi-Fi direct MAC address of the electronic device 120. In some embodiments, the electronic device 120 obtains its own first connection information through API of Win32. After the mobile device 110 receives Wi-Fi direct MAC address of the electronic device 120 (e.g. using the transceiver 113 and the wireless connection module), method 300 proceeds to operation 330. In operation 330, the mobile device 110 transmits a Wi-Fi direct pairing request (such as a first Wi-Fi direct pairing request) to the electronic device 120 (using the Wi-Fi point-to-point management module 115) according to the first connection information. After the electronic device 120 receives the Wi-Fi direct pairing request using the Wi-Fi direct broadcast management module 125 (and the transceiver 123 and the wireless connection module), method 300 proceeds to operation 340. In operation 340, the electronic device 120 obtains a second connection information related to the mobile device 110 and a device name of the mobile device 110 according to the Wi-Fi direct pairing request, and the electronic device 120 cancels (e.g. rejects) the Wi-Fi direct pairing request (using the Wi-Fi direct broadcast management module 125). In some embodiments, the Wi-Fi direct pairing request transmitted by the mobile device 110 includes the second connection information. In some embodiments, the second connection information includes a Wi-Fi direct MAC address of the mobile device 110.

Then, method 300 proceeds to operation 350. In operation 350, the electronic device 120 transmits the second connection information of the mobile device 110 and the first session ID (generated by the mobile device 110 in operation 310) to the mobile device 110. After the mobile device 110 receives the second connection information and the first session ID, method 300 proceeds to operation 360. For the clarity, the session ID received by the mobile device 110 from the electronic device 120 after operation 350 is referred to as a second session ID in the description below. In operation 360, the processor 111 determines whether the second session ID received from the electronic device 120 is identical to the first session ID transmitted to the electronic device 120 in operation 310. When the processor 111 determines that the received second session ID is identical to the first session ID transmitted to the electronic device 120 in operation 310, the processor 111 confirms that the received second connection information belongs to the mobile device 110. Then, the mobile device 110 stops waiting for the response of the Wi-Fi direct pairing request (the first Wi-Fi direct pairing request) and starts to listen to other Wi-Fi direct pairing requests. As described above, because the API of the mobile device can't obtain the Wi-Fi direct MAC address of the mobile device 110, above process enables the mobile device 110 to obtain its own Wi-Fi direct MAC address. In some embodiments, the processor 111 stores the obtained second connection information in the memory 112. In this way, the second connection information can be directly read from the memory 112, when there is a requirement to establish a Wi-Fi direct connection.

Then, method 300 proceeds to operation 370. In operation 370, the mobile device 110 transmits the second connection information, the device name of the mobile device 110, and the second session ID to the electronic device 120 using BLE. For the clarity, the session ID received by the electronic device 120 from the mobile device 110 after operation 370 is referred to as a third session ID in the description below. After the electronic device 120 receives the second connection information, method 300 proceeds to operation 380. In operation 380, the processor 121 determines whether the second connection information received using BLE is identical to the second connection information obtained according to the first Wi-Fi direct pairing request in operation 340. In some embodiments, the processor 121 further determines whether the third session ID received using BLE is identical to the first session ID received using BLE in operation 320. When the processor 121 determines that the second connection information received using BLE is identical to the second connection information received according to the first Wi-Fi direct pairing request in operation 340, the method proceeds to operation 390. In some embodiments, when the processor 121 determines that the second connection information received using BLE is identical to the second connection information received according to the first Wi-Fi direct pairing request in operation 340 and the third session ID received using BLE is identical to the first session ID received using BLE in operation 320, the method proceeds to operation 390. In operation 390, the electronic device 120 transmits a Wi-Fi direct pairing request (such as a second Wi-Fi direct pairing request) to the mobile device 110 according to the second connection information. Thus, the message transmitted using BLE by the mobile device 110 in operation 370 may be configured to trigger the electronic device 120 to transmit the Wi-Fi direct pairing request. In some embodiments, the Wi-Fi direct broadcast management module 125 transmits the second connection information to the Wi-Fi direct connection management module 126. The electronic device 120 transmits the second Wi-Fi direct pairing request using the Wi-Fi direct connection management module 126. In some embodiments, when the processor 121 determines that the received second connection information is identical to the second connection information previously obtained in operation 340, the processor 121 initiates a Wi-Fi direct searching process. In the Wi-Fi direct searching process, the processor 121 searches nearby Wi-Fi direct devices so as to search the device whose device name and second connection information matches the mobile device 110. After discovering the mobile device 110 according to the device name and the second connection information, the electronic device 120 transmits a Wi-Fi direct pairing request (such as a second Wi-Fi direct pairing request). In some embodiments, the mobile device 110 displays a confirmation message on the screen after receiving the Wi-Fi direct pairing request. After the user confirms at least one confirmation message (such as tapping an option), the mobile device 110 accepts the Wi-Fi direct pairing request (using the Wi-Fi point-to-point management module 115) and establishes a Wi-Fi direct connection with the electronic device 120.

In some embodiments, the electronic device 120 (and the mobile device 110) starts to perform method 200 or method 300 in response to the user activates an H.264 image transmission service or application. In some embodiments, after the H.264 image transmission application is activated, the H.264 image transmission application causes the electronic device 120 to activates a Wi-Fi direct broadcast mode to listen to pairing requests and causes the electronic device 120 initiates BLE service and wait for connection. Then, operation 210 or operation 310 and subsequent operations are performed. In some embodiments, after operation 250 or operation 390, the mobile device 110 establishes a Wi-Fi direct connection with the electronic device 120. The mobile device 110 and the electronic device 120 will obtain virtual Internet protocol (IP) address of each other. The mobile device 110 transmits H.264 encoded data through virtual IP address to transmit image.

Figure 4:
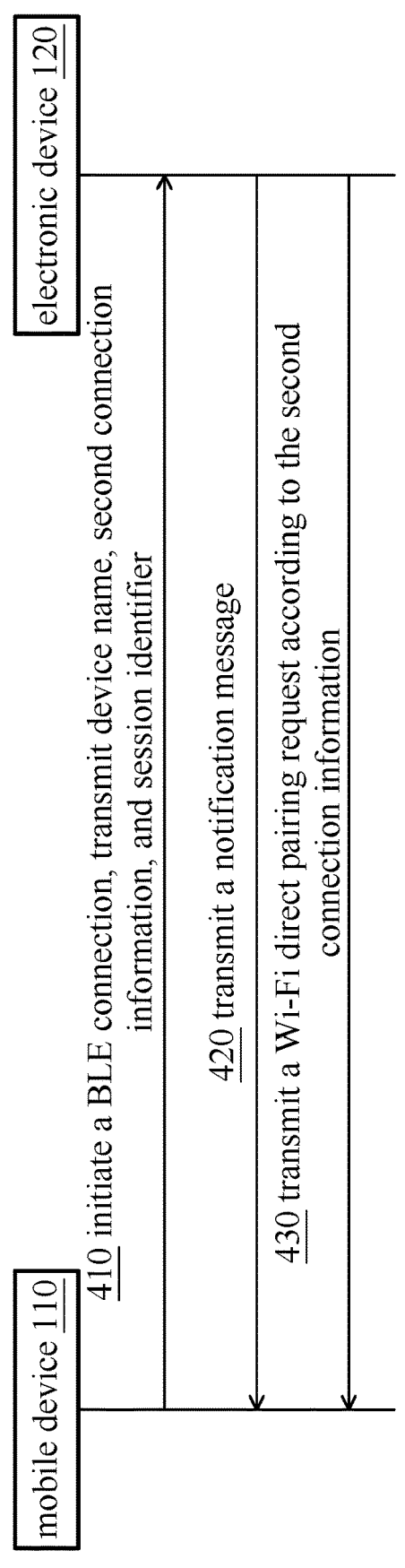
FIG. 4 is a flow diagram of the method for establishing wireless communication connection according to the embodiments of the present disclosure.

FIG. 4 is a flow diagram of the method 400 for establishing wireless communication connection according to the embodiments of the present disclosure. Method 400 can be performed by the processors 111 and 121 in the communication system 100 of FIG. 1A. Method 400 is described below in reference to FIGS. 1A, 1B. Method 400 is a method for re-establishing Wi-Fi direct connection (establishing Wi-Fi direct connection again) after a waiting time, which is subsequent to the mobile device 110 has already obtained and stored its own second connection information (operation 360). For example, method 400 is performed in a situation that the mobile device 110 attempts to reconnect to the electronic device 120 after the mobile device 110 is disconnected, sleeps, or is in a state unable to be accessed. Method 400 may start from operation 410. In operation 410, the mobile device 110 initiates a BLE connection with the electronic device 120 (using the BLE service module 114). The mobile device 110 transmits its own device name, second connection information stored in the memory 112, and generated session ID to the electronic device 120. In some embodiments, the second connection information comprises the Wi-Fi direct MAC address of the mobile device 110. The BLE connection can be established in the same way as described in operation 310.

After the electronic device 120 receives the device name, second connection information, and the session ID of the mobile device 110 (using the BLE broadcast management module 124), method 400 proceeds to operation 420. In operation 420, the electronic device 120 transmits a notification message to the mobile device 110. The notification message indicates the mobile device 110 not to transmit Wi-Fi direct pairing request and to wait for the Wi-Fi direct pairing request. Because the electronic device 120 has already obtained the second connection information of the mobile device 110, the Wi-Fi direct pairing can be performed directly without performing multiple operations in the methods 200 and 300. Then method 400 proceeds to operation 430. In operation 430, the electronic device 120 transmits a Wi-Fi direct pairing request (such as a third Wi-Fi direct pairing request) to the mobile device 110 according to the second connection information (using the Wi-Fi direct connection management module 126). In some embodiments, the processor 121 perform a Wi-Fi direct search process described above in refer to FIG. 3A to transmit the Wi-Fi direct pairing request. In some embodiments, the mobile device 110 displays a confirmation message on the screen, after receiving the Wi-Fi direct pairing request (using the Wi-Fi point-to-point management module 115). After at least one confirmation message is confirmed by the user (e.g. by selecting an option), the mobile device 110 accepts the Wi-Fi direct pairing request (using the Wi-Fi point-to-point management module 115) and establishes a Wi-Fi direct connection with the electronic device 120.

Methods according to embodiments of the present disclosure allow user to establish Wi-Fi direct connection with simple operations (such as scanning QR code). Thus, methods according to embodiments of the present disclosure can address the problem that the pairing usually fails when the request is transmitted from cell phone and improve user experience.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of establishing a wireless communication connection, comprising:

establishing, via a mobile device, a Bluetooth low energy (BLE) connection to an electronic device, wherein the electronic device transmits a first connection information related to the electronic device to the mobile device using the BLE;

transmitting, via the mobile device, a first Wi-Fi direct pairing request to the electronic device according to the first connection information;

obtaining, via the electronic device, a second connection information related to the mobile device, according to the first Wi-Fi direct pairing request, and cancelling the first Wi-Fi direct pairing request; and transmitting, via the electronic device, a second Wi-Fi direct pairing request to the mobile device according to the second connection information to establish a Wi-Fi direct connection.

2. The method as claimed in claim 1, wherein the first connection information related to the electronic device comprises a Wi-Fi direct media access control (MAC) address of the electronic device.

3. The method as claimed in claim 1, wherein the second connection information related to the mobile device comprises a Wi-Fi direct media access control (MAC) address of the mobile device.

4. The method as claimed in claim 1, further comprising:

transmitting, via the mobile device, a first session identifier to the electronic device using the BLE, before transmitting the first connection information, wherein the electronic device further transmits the first session identifier and the first connection information to the mobile device using the BLE, and the electronic device further transmits the first session identifier and the second connection information to the mobile device.

5. The method as claimed in claim 4, further comprising:

receiving, via the mobile device, the second connection information and a second session identifier from the electronic device;

determining, via the mobile device, that the second session identifier is identical to the first session identifier that is transmitted to the electronic device; and stopping, via the mobile device, waiting for the first Wi-Fi direct pairing request and starting to listen to other Wi-Fi direct pairing requests.

6. The method as claimed in claim 1, further comprising:

transmitting, via the electronic device, the second connection information to the mobile device;

transmitting, via the mobile device, the second connection information to the electronic device using the BLE, after the mobile device receives the second connection information; and determining, via the electronic device, that the second connection information received through the BLE is identical to the second connection information obtained via the first Wi-Fi direct pairing request, to determine to transmit the second Wi-Fi direct pairing request to the mobile device.

7. The method as claimed in claim 1, further comprising:

transmitting, via the electronic device, the second connection information to the mobile device; and storing, via the mobile device, the second connection information, after receiving the second connection information, wherein, when re-establishing Wi-Fi direct connection after a waiting time, the method further comprises:

transmitting, via the mobile device, the second connection information to the electronic device using the BLE; and transmitting, via the electronic device, a third Wi-Fi direct pairing request to the mobile device according to the second connection information and establishing the Wi-Fi direct connection.

8. An electronic device, comprising:

a processor, configured to implement a wireless connection module; wherein the wireless connection module is configured to:

transmit a first connection information related to the electronic device to a mobile device using Bluetooth low energy (BLE) in response to a BLE connection from the mobile device;

receive a first Wi-Fi direct pairing request, wherein the first Wi-Fi direct pairing request is transmitted via the mobile device according to the first connection information;

obtain a second connection information related to the mobile device, according to the first Wi-Fi direct pairing request and cancel the first Wi-Fi direct pairing request; and transmit a second Wi-Fi direct pairing request to the mobile device according to the second connection information and establish a Wi-Fi direct connection.

9. The electronic device as claimed in claim 8, wherein the first connection information related to the electronic device comprises a Wi-Fi direct media access control (MAC) address of the electronic device.

10. The electronic device as claimed in claim 8, wherein the second connection information related to the mobile device comprises a Wi-Fi direct media access control (MAC) address of the mobile device.

11. The electronic device as claimed in claim 8, wherein the wireless connection module is further configured to:

receive a session identifier from the mobile device using the BLE, before transmitting the first connection information;

transmit the session identifier and the first connection information to the mobile device using the BLE; and transmit the session identifier and the second connection information to the mobile device.

12. The electronic device as claimed in claim 8, wherein the electronic device is a personal computer or a laptop computer.

13. The electronic device as claimed in claim 8, wherein the wireless connection module is further configured to:

transmit the second connection information to the mobile device;

receive the second connection information from the mobile device using the BLE; and determine that the second connection information received through the BLE is identical to the second connection information obtained via the first Wi-Fi direct pairing request, determine to transmit the second Wi-Fi direct pairing request to the mobile device.

14. The electronic device as claimed in claim 8, wherein the wireless connection module is further configured to:

transmit the second connection information to the mobile device;

wherein the mobile device receives and stores the second connection information;

wherein, when re-establishing connection after a waiting time, the wireless connection module is further configured to:

receive the second connection information from the mobile device using the BLE; and transmit a third Wi-Fi direct pairing request to the mobile device according to the second connection information and establish the Wi-Fi direct connection.

15. A method of establishing a wireless communication connection for an electronic device, comprising:

transmitting, via the electronic device, a first connection information related to the electronic device to a mobile device using Bluetooth low energy (BLE) in response to a BLE connection from the mobile device;

receiving, via the electronic device, a first Wi-Fi direct pairing request from the mobile device, wherein the mobile device transmits the first Wi-Fi direct pairing request according to the first connection information;

obtaining, via the electronic device, a second connection information related to the mobile device, according to the first Wi-Fi direct pairing request and cancelling the first Wi-Fi direct pairing request; and transmitting, via the electronic device, a second Wi-Fi direct pairing request to the mobile device according to the second connection information and establishing a Wi-Fi direct connection.

16. The method as claimed in claim 15, wherein the first connection information related to the electronic device comprises a Wi-Fi direct media access control (MAC) address of the electronic device.

17. The method as claimed in claim 15, wherein the second connection information related to the mobile device comprises a Wi-Fi direct media access control (MAC) address of the mobile device.

18. The method as claimed in claim 15, further comprising:

receiving, via the electronic device, a session identifier from the mobile device using the BLE, before transmitting the first connection information;

transmitting, via the electronic device, the session identifier and the first connection information to the mobile device using the BLE; and transmitting, via the electronic device, the session identifier and the second connection information to the mobile device.

19. The method as claimed in claim 15, further comprising:

transmitting, via the electronic device, the second connection information to the mobile device;

receiving, via the electronic device, the second connection information from the mobile device using the BLE; and determining, via the electronic device, that the second connection information received through the BLE is identical to the second connection information obtained via the first Wi-Fi direct pairing request, determining to transmit the second Wi-Fi direct pairing request to the mobile device.

* * * * *